United States Patent [19]
Ikeda

[11] Patent Number: 5,774,430
[45] Date of Patent: Jun. 30, 1998

[54] OPTICAL MODULATION OVERWRITABLE MAGNETOOPTICAL RECORDING MEDIUM

[75] Inventor: Takashi Ikeda, Yokohama, Japan

[73] Assignee: Canon Kabushiki Kaisha, Tokyo, Japan

[21] Appl. No.: 827,467

[22] Filed: Mar. 28, 1997

[30] Foreign Application Priority Data

Apr. 1, 1996 [JP] Japan ................................. 8-078954

[51] Int. Cl.$^6$ ................................................ G11B 11/00
[52] U.S. Cl. .................................... 369/13; 428/694 MM
[58] Field of Search ............................. 369/13, 14, 110, 369/116; 365/122; 300/59, 114; 428/694 ML, 694 MM

[56] References Cited

U.S. PATENT DOCUMENTS

| 5,265,073 | 11/1993 | Osato | 369/13 |
| 5,450,382 | 9/1995 | Shiratori | 369/13 |
| 5,536,570 | 7/1996 | Osato | 369/13 |
| 5,629,909 | 5/1997 | Shiratori | 369/13 |

FOREIGN PATENT DOCUMENTS 63-48637  3/1988  Japan .

Primary Examiner—Tan Dinh
Attorney, Agent, or Firm—Fitzpatrick, Cella, Harper & Scinto

[57] ABSTRACT

A magnetooptical recording medium of this invention includes a transparent substrate, a first magnetic layer composed chiefly of GdFeCo and serving as a reproducing layer, a second magnetic layer serving as a memory layer, a third magnetic layer serving as an intermediate layer, a fourth magnetic layer serving as a writing layer, a fifth magnetic layer serving as a switching layer, and a sixth magnetic layer serving as an initializing layer. In this recording medium, the first, second, third, fourth, fifth and sixth magnetic layers are laid down over the substrate in this order, coercive-force energy of the fourth magnetic layer near a Curie temperature of the second magnetic layer is over $5 \times 10^4$ erg/cc, and a relation of $2E_w t_w < \sigma_s - \sigma_c$ is satisfied at room temperature where $E_w$, $t_w$, $\sigma_s$ and $\sigma_c$ are respectively coercive-force energy of the fourth magnetic layer, a layer thickness of the fourth magnetic layer, an energy density of an interfacial magnetic wall to be formed in the fifth magnetic layer and an energy density of an interfacial magnetic wall to be formed in the third magnetic layer.

2 Claims, 1 Drawing Sheet

OPTICAL MODULATION OVERWRITABLE MAGNETOOPTICAL RECORDING MEDIUM

BACKGROUND OF THE INVENTION

1. Field of the Invention

The present invention generally relates to a magnetooptical recording medium using exchange-coupled layers, and in particular to an optical modulation overwritable magnetooptical recording medium suitable for high-density recording.

2. Related Background Art

In recent years, the amount of information treated in information processing systems has been speedily increasing, and along therewith, media for recording or storing the information, which have high densities and large capacities, have been desired. Further, in order to speedily process a vast amount of information, a data transfer speed should be high.

In recording media with large capacities among recording media presently put into practical use, there exists a hard disc, a magnetooptical disc, an optical disc of a phase change type and so forth.

In the magnetooptical disc, however, when information is to be recorded, much time for recording is required since previously-recorded data is erased, then new data is recorded and verification of the new data is performed. Hence, the following system has been recently studied and this system is partly put into practical use. In this system, new data is overwritten on previously-recorded data such that time needed for erasure of the previous data is eliminated and thus the recording time is shortened. In such a system, there exists a magnetic-field modulation method, for example. In this system, digital signals to be recorded are recorded corresponding to directions of a magnetic field applied to the recording medium. Therefore, the direction of the magnetic field needs to be inverted at high speed, so that a magnetic head should be positioned sufficiently close to the recording medium. As a result, where dust and the like are stuck to the surface of the recording medium, the magnetic head is likely to be scratched and defects of the recording occur.

Further, as another method, two optical heads for recording and erasure of information are used. In this method, an erasing head is arranged upstream of a recording head and the erasure of old information is executed immediately before the recording of new information. However, there is a problem in this system that the fabrication cost of a drive apparatus increases. Therefore, in order to perform overwriting without inverting the magnetic field by using one optical head, there has been proposed an optical modulation overwriting method wherein the intensity of laser light is changed corresponding to a digital signal to be recorded.

For the purposes of further improving the recording density of the recording medium and increasing the recording capacity, a small jitter value is required from the standpoint of the error rate. Hence, in order to obtain a still larger magnetooptical effect, there has been proposed an optical modulation overwritable magnetooptical recording medium additionally using a reproducing layer composed of material with a high Curie temperature (see Japanese Laid-Open Patent Application No. 63-48637). However, although the carrier level of a reproduced signal is enhanced due to the addition of the reproducing layer, the noise level also increases at the same time. As a result, there occurs a problem that the effect of the added reproducing layer is impaired.

SUMMARY OF THE INVENTION

It is an object of the present invention to provide an optical modulation overwritable magnetooptical recording medium in which the effect of a reproducing layer is further enhanced by reducing the noise level, making the jitter value small and the error rate small.

The object of the present invention is achieved by a magnetooptical recording medium which includes a transparent substrate, a first magnetic layer composed chiefly of GdFeCo and serving as a reproducing layer, a second magnetic layer serving as a memory layer, a third magnetic layer serving as an intermediate layer, a fourth magnetic layer serving as a writing layer, a fifth magnetic layer serving as a switching layer, and a sixth magnetic layer serving as an initializing layer. In this recording medium, the first, second, third, fourth, fifth and sixth magnetic layers are laid down over the substrate in this order. Coercive-force energy of the fourth magnetic layer near a curie temperature of the second magnetic layer is over $5 \times 10^4$ erg/cc, and a relation of $2E_w t_w < \sigma_s - \sigma_c$ is satisfied at room temperature where $E_w$, $t_w$, $\sigma_s$ and $\sigma_c$ are respectively coercive-force energy of the fourth magnetic layer, a layer thickness of the fourth magnetic layer, an energy density of an interfacial magnetic wall to be formed in the fifth magnetic layer and an energy density of an interfacial magnetic wall to be formed in the third magnetic layer at room temperature.

BRIEF DESCRIPTION OF DRAWINGS

By way of example and to make the description more clear, reference is made to the accompanying drawings in which.

DETAILED DESCRIPTION OF THE PREFERRED EMBODIMENTS

Embodiments of the present invention will be described with reference to the drawings hereinafter.

Figure 1:
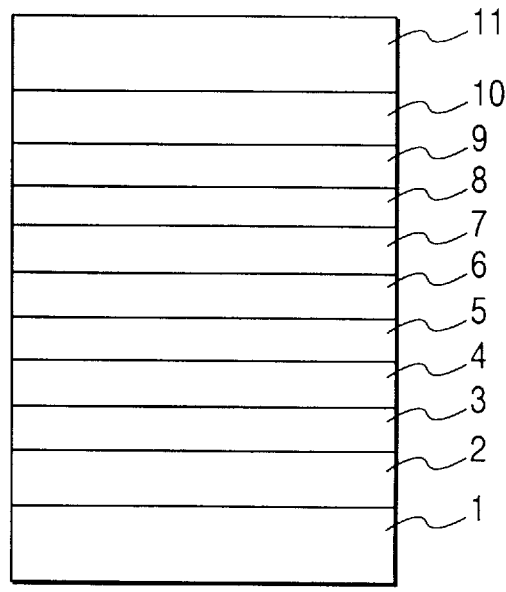
FIG. 1 is a cross-sectional view illustrating an embodiment of a magnetooptical recording medium according to the present invention.

FIG. 1 illustrates the structure of an embodiment of a magnetooptical recording medium of the present invention.

As illustrated in FIG. 1, in the magnetooptical recording medium of the present invention, at least a first magnetic layer 3 serving as a reproducing layer, a second magnetic layer 4 serving as a memory layer, a third magnetic layer 5 serving as an intermediate layer, a fourth magnetic layer 6 serving as a writing layer, a fifth magnetic layer 7 serving as a switching layer and a sixth magnetic layer 8 serving as an initializing layer are laid down in this order over a transparent substrate 1.

The following conditions are satisfied in the relationship between the memory layer 4 and the writing layer 6:

$$H_1 > \sigma_w / 2M_{s1} h_1 \quad H_2 > \sigma_w / 2M_{s2} h_2 \quad (1)$$

where $H_1$ is the coercive force of the memory layer, $H_2$ is the coercive force of the writing layer, $\sigma_w$ is the interfacial magnetic wall between the memory layer and the writing layer, $M_{s1}$ is the saturation magnetization of the memory layer, $M_{s2}$ is the saturation magnetization of the writing layer, $h_1$ is the layer thickness of the memory layer and $h_2$ is the layer thickness of the writing layer.

As material of the substrate of the present invention, polycarbonate, polymethylmethacrylate or the like can be preferably used.

As material of each magnetic layer, material showing perpendicular anisotropy can be used. Specifically, as material of the first magnetic layer 3 serving as the reproducing layer, the following material, such as GdFeCo, is optimal. This magnetic layer is made of material which exhibits a large magnetooptical effect at the time of reproduction and to which the recorded magnetic domain in the fourth magnetic layer 6 serving as the writing layer can be preferably transferred through the third magnetic layer 5 serving as the intermediate layer and the second magnetic layer 4 serving as the memory layer.

As material of the second magnetic layer 4 serving as the memory layer, in order to obtain a preferable record-bit conservable property, TbFeCo, DyFeCo, TbDyFeCo or the like having a large coercive-force energy can be preferably used.

As material of the third magnetic layer 5 serving as the intermediate layer, in order to obtain properties in which its Curie temperature is higher than the Curie temperature of the second magnetic layer 4 serving as the memory layer and preferable reproduction endurance is achieved, GdFeCo, NdFeCo, GdNdFeCo or the like having a small interfacial magnetic-wall energy can be preferably used.

As material of the fourth magnetic layer 6 serving as the writing layer, in order to obtain properties in which its Curie temperature is lower than the Curie temperature of the first magnetic layer 3 serving as the reproducing layer and higher than the Curie temperature of the second magnetic layer 4 serving as the memory layer and such magnetic domains as have preferable shapes can be formed, DyFeCo, TbFeCo, DyGdFeCo, TbGdFeCo or the like can be preferably used.

As material of the fifth magnetic layer 7 serving as the switching layer, in order to obtain properties in which its interfacial magnetic-wall energy is large and its Curie temperature is lower than the Curie temperature of the second magnetic layer 4 serving as the memory layer, TbFe, DyFe, TbFeCo, DyFeCo, TbDyFe, TbDyFeCo or the like can be preferably used.

As material of the sixth magnetic layer 8 serving as the initializing layer, since the prevention of inversion of the magnetic domain is required in a range of used temperatures, TbCo, TbFeCo, DyCo, DyFeCo or the like having a high Curie temperature and a large coercive force can be preferably used.

As illustrated in FIG. 1, in order to improve optical and thermal characteristics and endurance, a first dielectric layer 2, a second dielectric layer 9, a thermal diffusion layer 10 and a protective layer 11 may be provided between the substrate 1 and the first magnetic layer 3 and on the side of the sixth magnetic layer 8 opposite to the substrate side thereof.

As material of the dielectric layer, SiN, SiO, SiC, SiAlON, ZnS or the like can be used. As material of the thermal diffusion layer 10, AlCr, Au, Pt or the like can be used. As material of the protective layer 11, well-known ultraviolet-ray hardening resin can be used.

In the optical modulation overwritable magnetooptical recording medium having the reproducing layer, the magnetic domain in the writing layer is transferred to the memory layer due to the exchange coupling force and the magnetic domain in the reproducing layer also influences the shape of the magnetic domain in the memory layer during a cooling process from the Curie temperature of the memory layer. Therefore, it can be said that the shape of the magnetic domain formed in the memory layer is mainly determined by energy balance among those three layers and that when the influence from the reproducing layer is large, the shape of the magnetic domain is confused and thus the noise level increases.

Hence, in the optical modulation overwritable magnetooptical recording medium of the present invention in which the reproducing layer is formed of GdFeCo as a chief constituent, the coercive-force energy of the fourth magnetic layer 6 serving as the writing layer is set to a value above $5 \times 10^4$ erg/cc near the Curie temperature of the second magnetic layer 4 serving as the memory layer and thus this coercive-force energy is much larger than the coercive-force energy (coercive-force energy of GdFeCo is as small as a value which is almost unable to be detected) of the first magnetic layer 3 serving as the reproducing layer. As a result, the transferring function from the reproducing layer is relatively reduced, so that the increase of the noise level is depressed and a small jitter value is achieved (in general, this value is preferably below 2 [ns], when considering the bit-error rate and the window margin of bit detection). The Curie temperature of the second magnetic layer 4 serving as the memory layer is preferably in a range between 140 and 180 degrees centigrade.

The coercive-force energy can be adjusted by regulating the sputtering pressure when forming the layer.

Further, since it is required that the direction of TM sub-lattice magnetization in the fourth magnetic layer 6 serving as the writing layer is aligned with the direction of TM sub-lattice magnetization in the initializing layer at room temperature (i.e., the initializing is required), the following condition is also satisfied at the same time:

$$2E_w t_w < \sigma_s - \sigma_c$$

where $E_w$, $t_w$, $\sigma_s$ and $\sigma_c$ are respectively the coercive-force energy of the fourth magnetic layer 6 serving as the writing layer at room temperature, the thickness of the fourth magnetic layer 6, the energy density of the interfacial magnetic wall to be formed in the fifth magnetic layer 7 serving as the switching layer and the energy density of the interfacial magnetic wall to be formed in the third magnetic layer 5 serving as the intermediate layer.

Specific embodiments of the present invention will be described hereinafter.

[First Embodiment]

FIG. 1 is a cross-sectional view illustrating an optical modulation overwritable magnetooptical recording medium of the present invention.

The optical modulation overwritable magnetooptical recording medium of this embodiment is fabricated in the following manner. Initially, on a polycarbonate substrate 1 de-gassed in a vacuum apparatus evacuated down to below $1 \times 10^{-4}$ Pa, a first dielectric layer 2, a first magnetic layer 3 serving as a reproducing layer, a second magnetic layer 4 serving as a memory layer, a third magnetic layer 5 serving as an intermediate layer, a fourth magnetic layer 6 serving as a writing layer, a fifth magnetic layer 7 serving as a switching layer, a sixth magnetic layer 8 serving as an initializing layer, a second dielectric layer 9 and a thermal diffusion layer 10 are consecutively laid down with vacuum being maintained. Then, in the atmospheric air, a protective layer 11 is formed by depositing ultraviolet-ray hardening resin. The first dielectric layer 2 is a SiN layer formed by using a Si target, introducing a mixed gas of Ar and $N_2$ into the chamber and performing reactive sputtering, and its thickness is 90 nm. The first magnetic layer 3 is a $Gd_{19}(Fe_{85}Co_{15})_{81}$ layer formed under a sputtering pressure of 0.2 Pa, whose thickness is 20 nm. The second magnetic layer 4 is a $Tb_{26}(Fe_{94}Co_6)_{74}$ layer formed under a sputtering pressure of 0.7 Pa, whose thickness is 25 nm. The third magnetic layer 5 is a $Gd_{33}(Fe_{85}Co_{15})_{67}$ layer formed under a sputtering pressure of 0.2 Pa, whose thickness is 10 mn. The fourth magnetic layer 6 is a $(Dy_{85}Gd_{15})_{19}(Fe_{85}Co_{15})_{81}$ layer formed under a sputtering pressure of 0.6 Pa, whose thickness is 30 nm. The coercive-force energy of the fourth magnetic layer 6 at the Curie temperature of the second magnetic layer 4 is $9.5 \times 10^4$ erg/cc, and that at room temperature is $9.3 \times 10^5$ erg/cc. The fifth magnetic layer 7 is a $Tb_{25}Fe_{75}$ layer formed under a sputtering pressure of 0.5 Pa, whose thickness is 10 nm. The interfacial magnetic-wall energy density to be formed in this layer is 5.9 erg/cm². The sixth magnetic layer 8 is a $Tb_{22}(Fe_{20}Co_{80})_{78}$ layer formed under a sputtering pressure of 0.2 Pa, whose thickness is 30 nm. The above magnetic layers are respectively formed by co-sputtering, using a RE target, a Fe target and a Co target. Similar to the first dielectric layer 2, the second dielectric layer 9 is a SiN layer formed by the reactive sputtering, whose thickness is 10 nm. The thermal diffusion layer 10 is an AlCr layer formed by the sputtering under a sputtering pressure of 0.3 Pa, using an AlCr target. Its thickness is 40 nm. The protective layer 11 is formed by applying ultraviolet-ray hardening resin by a spinner and then hardening the resin by illuminating the resin with ultraviolet rays.

[Second Embodiment]

The second embodiment is the same as the first embodiment, except that the composition of the fourth magnetic layer 6 is changed to $(Dy_{75}Gd_{25})_{19}(Fe_{85}Co_{15})_{81}$, the coercive-force energy of the fourth magnetic layer 6 at the Curie temperature of the second magnetic layer 4 is changed to $8.2 \times 10^4$ erg/cc and that at room temperature is changed to $8.0 \times 10^5$ erg/cc.

[Embodiment 3]

The third embodiment is the same as the second embodiment, except that the sputtering pressure of the fourth magnetic layer 6 is changed to 0.4 Pa, the coercive-force energy of the fourth magnetic layer 6 at the Curie temperature of the second magnetic layer 4 is changed to $6.3 \times 10^4$ erg/cc and that at room temperature is changed to $6.2 \times 10^5$ erg/cc. [Embodiment 4]

The fourth embodiment is the same as the first embodiment, except that the composition of the fourth magnetic layer 6 is changed to $Tb_{17}(Fe_{86}Co_{14})_{83}$ having a thickness of 13 nm, the sputtering pressure is changed to 0.4 Pa, the coercive-force energy of the fourth magnetic layer 6 at the Curie temperature of the second magnetic layer 4 is changed to $9.9 \times 10^4$ erg/cc and that at room temperature is changed to $1.5 \times 10^6$ erg/cc.

Comparative examples will be described.

[FIRST COMPARATIVE EXAMPLE]

A first comparative example is the same as the first embodiment, except that the composition of the fourth magnetic layer 6 is changed to $(Dy_{50}Gd_{50})_{19}(Fe_{85}Co_{15})_{81}$, the coercive-force energy of the fourth magnetic layer 6 at the Curie temperature of the second magnetic layer 4 is changed to $4.9 \times 10^4$ erg/cc and that at room temperature is changed to $4.8 \times 10^5$ erg/cc.

[SECOND COMPARATIVE EXAMPLE]

A second comparative example is the same as the first embodiment, except that the sputtering pressure of the fourth magnetic layer 6 is changed to 0.2 Pa, the coercive-force energy of the fourth magnetic layer 6 at the Curie temperature of the second magnetic layer 4 is changed to $3.8 \times 10^4$ erg/cc and that at room temperature is changed to $3.7 \times 10^5$ erg/cc.

[THIRD COMPARATIVE EXAMPLE]

In the first embodiment, the composition of the second magnetic layer 4 is changed to $Tb_{24}(Fe_{89}Co_{11})_{76}$. Further, the fourth magnetic layer 6 is changed to $Tb_{16}(Fe_{86}Co_{14})_{84}$ having a thickness of 13 nm which is formed under the sputtering pressure of 0.2 Pa. At this time, the coercive-force energy of the fourth magnetic layer 6 at the Curie temperature of the second magnetic layer 4 is $3.4 \times 10^4$ erg/cc and that at room temperature is $7.4 \times 10^5$ erg/cc.

Figure 2:
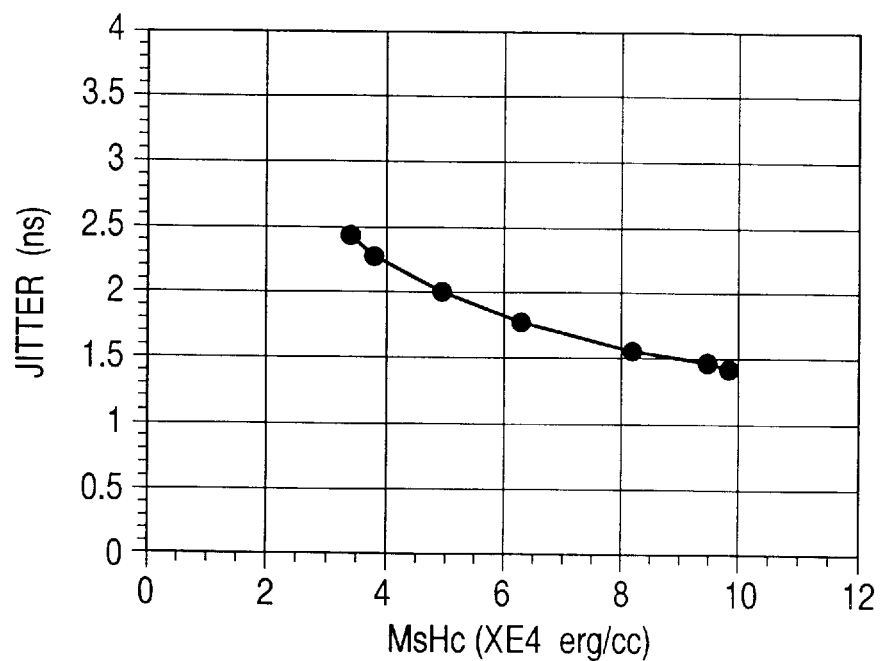
FIG. 2 is a graph illustrating the relationship between magnitudes of coercive-force energy of fourth magnetic layers at Curie temperatures of second magnetic layers and jitter values in first to fourth embodiments and first to third comparative examples.

The relationship between magnitudes of the coercive-force energy of the fourth magnetic layers at the Curie temperatures of the second magnetic layers in the above-discussed first to fourth embodiments and first to third comparative examples and the jitter values therein is illustrated in FIG. 2. The measurement was performed under conditions of an applied recording magnetic field of 300 G, a line speed of 9.0 m/s, a recording frequency of 5.8 MHz, a laser wavelength of 780 nm and NA of 0.55. As is known from this result, it is apparent that the magnitude of the jitter value is dependent from the magnitude of the coercive-force energy of the fourth magnetic layer 6 at the Curie temperature of the second magnetic layer.

As described above, according to the present invention, it is possible to provide an optical modulation overwritable magnetooptical recording medium in which the jitter value is small and the error rate is small.

What is claimed is:

1. A magnetooptical recording medium comprising:
    a transparent substrate;
    a first magnetic layer composed chiefly of GdFeCo, said first magnetic layer serving as a reproducing layer;
    a second magnetic layer, said second magnetic layer serving as a memory layer;
    a third magnetic layer, said third magnetic layer serving as an intermediate layer;
    a fourth magnetic layer, said fourth magnetic layer serving as a writing layer;
    a fifth magnetic layer, said fifth magnetic layer serving as a switching layer; and
    a sixth magnetic layer, said sixth magnetic layer serving as an initializing layer;
    wherein said first, second, third, fourth, fifth and sixth magnetic layers are laid down over said substrate in this order, coercive-force energy of said fourth magnetic layer near a Curie temperature of said second magnetic layer is equal to or more than $5 \times 10^4$ erg/cc, and a relation of $2E_w t_w < \sigma_s - \sigma_c$ is satisfied at room temperature where $E_w$, $t_w$, $\sigma_s$ and $\sigma_c$ are respectively coercive-force energy of said fourth magnetic layer, a layer thickness of said fourth magnetic layer, an energy density of an interfacial magnetic wall to be formed in said fifth magnetic layer and an energy density of an interfacial magnetic wall to be formed in said third magnetic layer.

2. A magnetooptical recording medium according to claim 1, wherein a Curie temperature of said first magnetic layer is higher than a Curie temperature of said fourth magnetic layer.

* * * * *

UNITED STATES PATENT AND TRADEMARK OFFICE
CERTIFICATE OF CORRECTION

PATENT NO. : 5,774,430

DATED : June 30, 1998

INVENTOR(S) : TAKASHI IKEDA

It is certified that error appears in the above-identified patent and that said Letters Patent is hereby corrected as shown below:

COLUMN 2:

Line 19, "curie" should read --Curie--.

Signed and Sealed this

Eleventh Day of May, 1999

Attest:

Q. TODD DICKINSON

Attesting Officer

Acting Commissioner of Patents and Trademarks